United States Patent [19]

Chakrabarti et al.

[11] Patent Number: 5,071,901

[45] Date of Patent: Dec. 10, 1991

[54] QUATERNARY AMMONIUM SALT SURFACE-MODIFIED AMMONIUM POLYPHOSPHATE

[75] Inventors: Paritosh M. Chakrabarti, Pittsburgh; Kenneth J. Sienkowski, Bethlehem, both of Pa.

[73] Assignee: PPG Industries, Inc., Pittsburgh, Pa.

[21] Appl. No.: 605,816

[22] Filed: Oct. 30, 1990

[51] Int. Cl.$^5$ .................................................. C08K 3/32
[52] U.S. Cl. ........................................ 524/366; 523/179;
252/606; 252/609; 524/387; 524/415; 524/416;
524/236; 524/238; 524/247
[58] Field of Search ............... 524/415, 416, 236, 238,
524/247, 387, 386; 252/609, 606; 523/179

[56] References Cited

U.S. PATENT DOCUMENTS

| | | |
|---|---|---|
| 2,681,326 | 6/1954 | Christianson ..................... 524/416 |
| 3,397,035 | 8/1968 | Shen et al. ........................ 524/416 |
| 3,936,416 | 2/1976 | Brady .............................. 260/42.18 |
| 4,115,351 | 9/1978 | Joh ................................... 524/416 |
| 4,289,831 | 9/1981 | Last ................................. 428/515 |
| 4,616,049 | 10/1986 | Thompson et al. ............... 523/212 |
| 4,686,791 | 8/1987 | Miyata ............................. 524/437 |
| 4,694,030 | 9/1987 | von Bonin et al. ............... 523/179 |
| 4,729,854 | 3/1988 | Miyata et al. ..................... 252/609 |
| 4,851,463 | 7/1989 | Opsahl et al. .................... 524/437 |
| 4,992,215 | 2/1991 | Green .............................. 252/609 |

Primary Examiner—Veronica P. Hoke
Attorney, Agent, or Firm—George D. Morris

[57] ABSTRACT

The water leaching of ammonium polyphosphate from compositions comprising organic polymer and particles of ammonium polyphosphate is reduced if the ammonium polyphosphate is surface-modified with quaternary ammonium salt cationic surfactant.

25 Claims, No Drawings

QUATERNARY AMMONIUM SALT SURFACE-MODIFIED AMMONIUM POLYPHOSPHATE

Ammonium polyphosphate, often abbreviated "APP", is an important ingredient for providing fire retardancy to many organic polymers. APP can be used alone or it can be used with various synergists, depending upon the polymer system in which it is used. For example, APP can be used alone in poly(ester urethane) systems, whereas it is generally used with carbonific and/or spumific agents in polyolefin systems, epoxy systems, and poly(ether urethane) systems. These are only exemplary and APP is useful as a fire retardant in many other polymer systems.

The use of polyolefins for insulating electrically conducting wiring is known. Generally the polyolefin is extruded around the wire during manufacture. The polyolefin insulation is a good electrical insulator and, when used alone, is substantially waterproof. The main disadvantage of polyolefin insulation is its flammability. Once ignited, the burning polyolefin produces copious amounts of smoke and drips burning liquid polyolefin which tends to spread the fire. Polyolefin insulated wires and cables and bundles of these are therefore substantial firehazards. It is commonplace in buildings and ships to have bundles of insulated electrical wires and cables passing through openings in walls or bulkheads to expedite the delivery of electrical power from room to room. In time of fire these openings can be instrumental in spreading the fire and smoke from room to room.

Various fire retardants have been admixed with the polyolefin in order to provide fire retardancy to the composition. These have been only partially successful, however, because most fire retardants are not very compatible with polyolefins or because they are prohibitively expensive for commercial applications.

One approach that has been followed is the incorporation of materials which impart intumescence to the polyolefin-based insulation composition. Such intumescent compositions form adherent chars which swell up and impedge further burning of the underlying composition. One class of intumescent compositions used for electrical wiring insulation comprises polyolefin, ammonium polyphosphate, and at least one carbonific or spumific. Carbonifics are nonresinous materials which produce large volumes of both nonflammable gas and carbon in the presence of phosphoric acid. Carbonific materials are generally carbohydrates or polyfunctional alcohols such as pentaerythritol. Spumifics are materials which release large quantities of gas at elevated temperatures. Spumifics are often resinous in nature and often act as binders in addition to forming gas. Spumific materials are most often amides or amines such as urea, guanidine, or dicyandiamide, which liberate gaseous pyrolysis products.

APP is particularly useful because it has a high phosphorus content and because it yields phosphoric acid at temperatures below the decomposition temperatures of the carbonifics and spumifics and yet above the normal temperatures used for processing the intumescent composition.

Notwithstanding its advantages, ammonium polyphosphate suffers from the distinct disadvantage that it is water-soluble. Electrical insulation containing APP is generally deficient in water resistance. Leaching of APP from the composition can lead to failure of the electrical insulating properties of the composition, and reduction of fire retardancy due to the loss of potential phosphoric acid necessary for the intumescent process. Encapsulation of APP particles by various polymers has been tried in an effort to solve the problem, but this has resulted in only marginal improvement. The results have been largely unsuccessful.

It has now been found that surface modification of APP particles with a certain class of surfactants results in markedly improved water resistance. Although it is not desired to be bound by any theory, it is believed that the surface energies of polyolefins and APP are so different they are substantially incompatible. It is believed that a goodly proportion of the APP particles will not be wetted by polyolefin under melt or near-melt processing conditions, and that these will have a tendency to form interlinked channels throughout the bulk of the composition. This will allow water attack, resulting not only in partial leaching of the APP, but also will lead to the creation of water channels through the bulk of the composition. The net results are loss of fire retardancy and loss of electrically insulative character.

Accordingly, and irrespective of any theory, one embodiment of the invention is particles of surface-modified ammonium polyphosphate comprising particulate ammonium polyphosphate surface-modified with at least one quaternary ammonium salt cationic surfactant represented by the formula:

$$R_1R_2R_3R_4N^+ \; X^-$$

wherein: (a) each $R_1$, $R_2$, $R_3$, and $R_4$ is independently an aliphatic hydrocarbon group, (b) $R_1$, $R_2$, $R_3$, and $R_4$ collectively contain from about 15 to about 48 carbon atoms, and (c) X is an anion selected from the group consisting of chloride, bromide, sulfate/2, phosphate/3, methosulfate, and ethosulfate.

The aliphatic hydrocarbon groups used for any of $R_1$, $R_2$, $R_3$, and $R_4$ may vary widely. Alkyl, alkenyl, alkadienyl, and alkatrienyl are examples of aliphatic hydrocarbon groups that may be used. The aliphatic hydrocarbon groups may individually be straight or branched, but preferable they are straight.

It is preferred that at least one aliphatic hydrocarbon group attached to the quaternary nitrogen atom correspond to: (a) an aliphatic hydrocarbon group attached to a monocarboxylic acid derived from the triglyceride of a natural fat or oil, (b) an aliphatic hydrocarbon group attached the hydroxyl group of a long chain monoalcohol produed by reduction of a monocarboxylic acid derived from the triglyceride of a natural fat or oil, (c) an aliphatic hydrocarbon group produced by hydrogenating an unsaturated aliphatic hydrocarbon group attached to a monocarboxylic acid derived from the triglyceride of a natural fat or oil, or (d) an aliphatic hydrocarbon group produced by hydrogenating an unsaturated aliphatic hydrocarbon group attached to the hydroxyl group of a long chain monoalcohol produced by reduction of a monocarboxylic acid derived from the triglyceride of a natural fat or oil. In many cases two such aliphatic hydrocarbon groups are attached to the quaternary nitrogen atom.

Of the smaller alkyl groups that can be independently used for from one to three of $R_1$, $R_2$, $R_3$, and $R_4$, methyl and ethyl are preferred. Methyl is especially preferred.

The surfactant content of the surface-modified APP particles can vary widely. Ordinarily the surfactant constitutes from about 0.01 to about 5 percent by weight of the particles. Frequently the surfactant constitutes from about 0.05 to about 3 percent by weight of the particles. From about 0.1 to about 1 percent by weight is preferred.

The surface-modified APP particles of the invention may be prepared by admixing particulate APP with a solution of the surfactant and then removing the solvent. Any inert solvent which will dissolve the surfactant while not dissolving significant amounts of the APP can be used. Examples of suitable inert solvents include chlorinated aliphatic hydrocarbons such as methylene chloride, chloroform, and the like, aromatic hydrocarbons such as toluene, xylene, and the like, and/or chlorinated aromatic hydrocarbons such as chlorobenzene, and the like. In most cases the treated APP particles are separated from the bulk of the surfactant solution by decantation, filtration, or centrifugation, and the residual solvent is then removed by evaporation (i.e., drying) at ambient or elevated temperatures. Alternatively the surfactant solution may be applied to the particulate APP. Any of the well known methods of applying liquids to particulate materials may be used. Examples include spraying or dipping. Usually the particulate APP is mixed or agitated during the application. Mechanical mixers, pneumatic mixers, and fluidized beds are useful for this purpose. Following application the residual solvent is removed by evaporation. The relative amounts of particulate APP and dissolved surfactant which are admixed may vary considerably and depend upon whether or not the treated APP particles are removed from the bulk of the surfactant solution before evaporation of the solvent.

The surface-modified APP particles of the invention may often be prepared by applying liquid neat cationic surfactant to particulate APP. Any of the well known methods of applying neat liquids to particulate materials may be used. Examples include spraying or dripping. Usually the particulate materials are mixed or agitated during the application. Mechanical mixers, pneumatic mixers, and fluidized beds are useful for this purpose. The temperature of the neat cationic surfactant during application is at least 0° C. or the melting point of the surfactant, whichever is higher. The temperature of the neat cationic surfactant during application is not greater than about 300° C. or the decomposition temperature of the surfactant, whichever is lower. The relative amounts of neat surfactant and particulate APP which are admixed may vary considerably, but usually the weight ratio of the surfactant to the particulate APP is in the range of from about 0.01:99.99 to about 5:95. Frequently the weight ratio is in the range of from about 0.05:99.95 to about 3:97. A weight ratio in the range of from about 0.1:99.9 to about 1:99 is preferred.

Another embodiment of the invention is a composition comprising organic polymer and particles of surface-modified ammonium polyphosphate, the particles comprising particulate ammonium polyphosphate surface-modified with at least one quaternary ammonium salt cationic surfactant represented by the formula:

$$R_1R_2R_3R_4N^+ \; X^-$$

wherein: (a) each $R_1$, $R_2$, $R_3$, and $R_4$ is independently an aliphatic hydrocarbon group, (b) $R_1$, $R_2$, $R_3$, and $R_4$ collectively contain from about 15 to about 48 carbon atoms, and (c) X is an anion selected from the group consisting of chloride, bromide, sulfate/2, phosphate/3, methosulfate, and ethosulfate, which surface-modified ammonium polyphosphate particles have been earlier described.

The organic polymer is usually flammable but in some cases it may be nonflammable. Ordinarily the organic polymer is thermoplastic. The organic polymer may be a homopolymer, a copolymer, a terpolymer, an interpolymer, a graft polymer, or a mixture of polymers. Examples of polymers which may be used include polyolefins, polystyrene, polyesters, polyamides, polyurethanes (including poly(ester urethanes) and poly(ether urethanes)), and polycarbonates. The preferred organic polymers are the polyolefins, including polyethylene (high density, medium density, low density, linear low density, or mixtures), polypropylene (atactic, isotactic, syndiotactic, stereoblock, or mixtures), copolymers of ethylene and propylene, copolymers of ethylene and vinyl acetate, and mixtures thereof, and poly(ester urethanes).

The amounts of surface-modified APP which are present in compositions of the invention are subject to wide variation. Ordinarily the weight ratio of the surface-modified APP particles to the organic polymer is in the range of from about 10:100 to about 100:100. Often the weight ratio is in the range of from about 15:100 to about 85:100. A weight ratio in the range of from about 20:100 to about 70:100 is preferred.

In most cases the composition also comprises carbonific, spumific, or a mixture thereof. The amounts of the carbonific, spumific, or mixture thereof which may be present in compositions of the invention are subject to wide variation. Ordinarily the weight ratio of the carbonific, spumific, or mixture thereof to the surface-modified APP particles is in the range of from about 10:100 to about 100:100. Often the weight ratio is in the range of from about 15:100 to about 80:100. A weight ratio in the range of from about 25:100 to about 60:100 is preferred.

One or more other materials which increase fire retardancy may optionally also be present in the composition. Examples of such materials include organic fire retardant compound. In most, but not all cases, the organic fire retardant compound is halogen-containing organic fire retardant compound. Of these, the chlorine-containing and bromine-containing organic fire retardant compounds are preferred. Examples of organic fire retardant compounds which may be used in most cases include octabromodiphenyl oxide, decabromodiphenyl oxide, 1,2-bis(tribromophenoxy)ethane, N-methylhexabromodiphenylamine, poly[2,2-bis(bromomethyl)-trimethylene carbonate], and any of the usual halogen-containing organic fire retardants.

One or more other materials which will increase fire retardancy may optionally be present in the composition. Examples of such materials include zinc oxide, zinc borate, and ferric oxide.

The compositions of the invention may optionally contain plasticizers, pigments, dyes, tints, antioxidants, visible light stabilizers, ultraviolet light stabilizers, and the like.

The listing of optional ingredients discussed above is by no means exhaustive. These and other ingredients may be employed in their customary amounts for their customary purposes so long as they are not antagonistic to flame retardant performance and good polymer formulating practice.

The compositions of the present invention have fire retardant characteristics and find many uses. They may be extruded into fibers, films, or other shapes, or molded, shaped, or formed into substantially any form. A preferred use, however, is as electrical insulation for wires and cables.

The invention is further described in conjunction with the following examples which are to be considered illustrative rather than limiting, and in which all parts are parts by weight and all percentages are percentages by weight unless otherwise specified.

EXAMPLES

Surface Modification of APP Particles

The following procedure was used to treat the APP particles. A one percent surfactant solution was prepared by adding 0.35 gram of surfactant to 35 grams of methylene chloride. This solution was covered and stirred with a magnetic stirrer for 10 minutes. Next, 10 grams of APP particles was added to the surfactant solution and the mixture was stirred for 15 minutes. Stirring was then terminated and the APP particles were allowed to settle. The excess surfactant solution was pipetted off and discarded. The treated APP particles were then air-dried overnight in a hood to evaporate off the residual solvent. The dried powder was then ground to break up agglomerates and to obtain a free-flowing powder. This powder was stored in sealed test tubes.

Dispersion of Surface-Modified APP in Polyethylene

Thirty-five grams of Petrothene NA 117 polyethylene (U.S. Industrial Chemicals) was added to the mixing chamber of a Brabender Plasti-corder torque rheometer at approximately 135° C. until the polyethylene was completely melted. Next, 5.25 grams of surface-modified APP was carefully added into the mixing chamber to provide a loading level of 15 parts of surface-modified APP per hundred parts of polyethylene resin, by weight (phr). The materials were mixed together for 5 minutes at approximately 100 revolutions per minute. The molten mixture was then placed between polytetrafluoroethylene coated plates and pressed in a laboratory press at 350° C. for several minutes until the mixture was pressed out flat. After cooling, the film was cut into three sections. These were stacked and placed between the polytetrafluoroethylene plates with 1.6 millimeter struts, and pressed once again in the laboratory press. This cutting, stacking, and pressing process was repeated until the films had a homogeneous appearance without visible air bubbles (if possible) in the film. In this manner 1.6 millimeter thick plaques were obtained for water immersion studies.

Determination of APP Leaching

Test specimens measuring either 5.08 centimeters×2.54 centimeters or 6.99 centimeters×3.81 centimeters were cut from the plaques. Samples were immersed in 237 milliliter wide mouth borosilicate jars filled with distilled-deionized water. The jars were sealed and placed in an 80° C. oven for 14 days. The samples were analyzed for phosphorus content by X-ray fluorescence (XRF) and by elemental analysis (EA). The result of an X-ray fluorescence analysis is an indication of the phosphorus content of a thin surface region of the sample. The result of an elemental analysis is an indication of the average phosphorus content throughout the bulk of the sample. The identities of the surfactant employed is shown in Table 1 and the results are shown in Table 2.

TABLE 1

| | Surfactant |
|---|---|
| Abbreviation | Identity |
| QS-1 | Dimethyl di(hydrogenated tallow) ammonium chloride |

TABLE 2

| | Results of Analyses for Phosphorus | | | | | |
|---|---|---|---|---|---|---|
| | Surface P by XRF, wt % Immersion Time | | Surface P | Bulk P by EA, wt % Immersion Time | | Bulk P |
| | 0 days | 14 days | Leached, % | 0 days | 14 days | Leached, % |
| Controls | | | | | | |
| Polyethylene Blank | 0 | 0 | — | — | — | — |
| APP, untreated | 4.7 | 1.6 | 66.0 | 4.60 | 3.88 | 15.6 |
| | 3.9 | 1.0 | 74.4 | | | |
| Surfactant | | | | | | |
| QS-1 | 3.05 | 1.50 | 50.8 | 3.76 | 3.61 | 4.0 |
| Comparative Example | | | | | | |
| APP, encapsulated with epoxy polymer | 4.5 | 1.4 | 68.9 | 4.27 | 3.61 | 15.5 |

A comparison of the Bulk P by Elemental Analysis for the polymer encapsulated APP and the untreated APP shows that encapsulation is not very effective in reducing the water leaching of APP. Similar comparisons of APP surface-modified with quaternary ammonium salt cationic surfactant with the untreated control shows that the surface-modification provided by the surfactant was effective in reducing the water leaching of APP.

The data also show that APP surface-modified with quaternary ammonium salt cationic surfactant tended to concentrate away from the surface of the samples. The reason for this is not known, but the effect is a distinct advantage since less APP is exposed at the surface for water extraction.

Although the present invention has been described with reference to specific details of certain embodiments thereof, it is not intended that such details should be regarded as limitations upon the scope of the invention except insofar as they are included in the accompanying claims.

We claim:

1. Particles of surface-modified ammonium polyphosphate comprising particulate ammonium polyphosphate surface-modified with at least one quaternary ammonium salt cationic surfactant represented by the formula:

$$R_1R_2R_3R_4N^+ \; X^-$$

wherein:
(a) each $R_1$, $R_2$, $R_3$, and $R_4$ is independently an aliphatic hydrocarbon group,
(b) $R_1$, $R_2$, $R_3$, and $R_4$ collectively contain from about 15 to about 48 carbon atoms, and
(c) X is an anion selected from the group consisting of chloride, bromide, sulfate/2, phosphate/3, methosulfate, and ethosulfate.

2. The particles of claim 1 wherein $R_1$, $R_2$, $R_3$, and $R_4$ are each independently alkyl, alkenyl, alkadienyl, or alkatrienyl.

3. The particles of claim 2 wherein $R_1$, $R_2$, $R_3$, and $R_4$ are straight.

4. The particles of claim 1 wherein at least one aliphatic hydrocarbon group attached to the quaternary nitrogen atom corresponds to:
(a) an aliphatic hydrocarbon group attached to a monocarboxylic acid derived from the triglyceride of a natural fat or oil,
(b) an aliphatic hydrocarbon group attached the hydroxyl group of a long chain monoalcohol produced by reduction of a monocarboxylic acid derived from the triglyceride of a natural fat or oil,
(c) an aliphatic hydrocarbon group produced by hydrogenating an unsaturated aliphatic hydrocarbon group attached to a monocarboxylic acid derived from the triglyceride of a natural fat or oil, or
(d) an aliphatic hydrocarbon group produced by hydrogenating an unsaturated aliphatic hydrocarbon group attached to the hydroxyl group of a long chain monoalcohol produced by reduction of a monocarboxylic acid derived from the triglyceride of a natural fat or oil.

5. The particles of claim 4 wherein from one to three of $R_1$, $R_2$, $R_3$, and $R_4$ are each independently methyl or ethyl.

6. The particles of claim 4 wherein from one to three of $R_1$, $R_2$, $R_3$, and $R_4$ are each methyl.

7. The particles of claim 1 wherein said surfactant is dimethyl di(hydrogenated tallow) ammonium chloride.

8. The particles of claim 1 wherein said surfactant constitutes from about 0.01 to about 5 weight percent of said particles.

9. The particles of claim 1 wherein said surfactant constitutes from about 0.05 to about 3 weight percent of said particles.

10. The particles of claim 1 wherein said surfactant constitutes from about 0.1 to about 1 weight percent of said particles.

11. A composition comprising organic polymer and particles of surface-modified ammonium polyphosphate, said particles comprising particulate ammonium polyphosphate surface-modified with at least one quaternary ammonium salt cationic surfactant represented by the formula:

$$R_1R_2R_3R_4N^+ \; X^-$$

wherein:
(a) each $R_1$, $R_2$, $R_3$, and $R_4$ is independently an aliphatic hydrocarbon group,
(b) $R_1$, $R_2$, $R_3$, and $R_4$ collectively contain from about 15 to about 48 carbon atoms, and
(c) X is an anion selected from the group consisting of chloride, bromide, sulfate/2, phosphate/3, methosulfate, and ethosulfate.

12. The composition of claim 11 wherein said surfactant constitutes from about 0.01 to about 5 percent by weight of said particles.

13. The composition of claim 11 wherein said surfactant constitutes from about 0.05 to about 3 percent by weight of said particles.

14. The composition of claim 11 wherein said surfactant constitutes from about 0.1 to about 1 percent by weight of said particles.

15. The composition of claim 11 which comprises carbonific, spumific, or a mixture thereof.

16. The composition of claim 15 wherein the weight ratio of said carbonific, spumific, or mixture thereof to said particles is in the range of from about 10:100 to about 100:100.

17. The composition of claim 15 which comprises carbonific.

18. The composition of claim 17 wherein said carbonific is pentaerythritol.

19. The composition of claim 11 wherein said organic polymer is poly(ester urethane).

20. The composition of claim 11 wherein said organic polymeric is polyolefin.

21. The composition of claim 20 wherein said polyolefin is polyethylene.

22. The composition of claim 20 wherein said polyolefin is polypropylene.

23. The composition of claim 11 wherein the weight ratio of said particles to said organic polymer is in the range from about 10:100 to about 100:100.

24. The composition of claim 11 wherein the weight ratio of said particles to said organic polymer is in the range of from about 15:100 to about 85:100.

25. The composition of claim 11 wherein the weight ratio of said particles to said organic polymer is in the range of from about 20:100 to about 70:100.

* * * * *